United States Patent
Murayama et al.

(10) Patent No.: US 11,811,039 B2
(45) Date of Patent: Nov. 7, 2023

(54) BATTERY PACK

(71) Applicant: Panasonic Intellectual Property Management Co., Ltd., Osaka (JP)

(72) Inventors: Chifumi Murayama, Osaka (JP); Shinya Motokawa, Hyogo (JP); Keisuke Shimizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 94 days.

(21) Appl. No.: 16/640,345

(22) PCT Filed: Jan. 22, 2019

(86) PCT No.: PCT/JP2019/001802
§ 371 (c)(1),
(2) Date: Feb. 19, 2020

(87) PCT Pub. No.: WO2019/151036
PCT Pub. Date: Aug. 8, 2019

(65) Prior Publication Data
US 2020/0358058 A1 Nov. 12, 2020

(30) Foreign Application Priority Data
Jan. 31, 2018 (JP) .................... 2018-014737

(51) Int. Cl.
*H01M 10/647* (2014.01)
*H01M 50/209* (2021.01)
(Continued)

(52) U.S. Cl.
CPC ..... *H01M 10/6555* (2015.04); *H01M 10/647* (2015.04); *H01M 50/209* (2021.01); *H01M 50/227* (2021.01); *H01M 50/233* (2021.01)

(58) Field of Classification Search
CPC ........... H01M 10/6556; H01M 10/658; H01M 10/6565; H01M 50/20; H01M 50/209; H01M 50/227; H01M 50/233; Y02E 60/10
See application file for complete search history.

(56) References Cited

U.S. PATENT DOCUMENTS

| | | | |
|---|---|---|---|
| 2009/0142653 A1 | 6/2009 | Okada et al. | |
| 2011/0129716 A1* | 6/2011 | Chung | B60L 50/64 429/120 |

(Continued)

FOREIGN PATENT DOCUMENTS

| | | |
|---|---|---|
| JP | 2009-134901 | 6/2009 |
| JP | 2009-134936 | 6/2009 |
| JP | 2016-046211 | 4/2016 |

OTHER PUBLICATIONS

International Search Report of PCT application No. PCT/JP2019/001802 dated Apr. 16, 2019.

*Primary Examiner* — Stewart A Fraser
*Assistant Examiner* — Lilia Nedialkova
(74) *Attorney, Agent, or Firm* — McDermott Will & Emery LLP

(57) ABSTRACT

A battery pack includes a battery stack having a plurality of prismatic batteries being stacked. The battery pack further includes a cooling plate extending in a stack direction of the prismatic batteries in the battery stack. The cooling plate includes a plurality of coolant passages and a plurality of grooves. The coolant passages extend in a perpendicular direction substantially perpendicular to the stack direction of the prismatic batteries, and allow a coolant to flow in the coolant passages. The grooves constitute heat conduction inhibitors configured to inhibit heat conduction in the stack direction of the prismatic batteries.

9 Claims, 9 Drawing Sheets

(51) Int. Cl.
_H01M 10/6555_ (2014.01)
_H01M 50/227_ (2021.01)
_H01M 50/233_ (2021.01)

(56) References Cited

U.S. PATENT DOCUMENTS

| | | | |
|---|---|---|---|
| 2014/0011059 A1* | 1/2014 | Hashimoto | B60L 50/64 |
| | | | 429/72 |
| 2017/0229749 A1* | 8/2017 | Rawlinson | H01M 50/20 |
| 2018/0215282 A1* | 8/2018 | Pohl | H01M 10/613 |
| 2018/0241103 A1* | 8/2018 | Pfeiff | H01M 10/66 |
| 2020/0096260 A1* | 3/2020 | Omi | F28F 9/0278 |

* cited by examiner

BATTERY PACK

TECHNICAL FIELD

The present disclosure relates to a battery pack.

BACKGROUND ART

PTL 1 discloses a conventional battery pack. This battery pack includes a battery stack and a cooling plate. The battery stack includes a plurality of prismatic batteries stacked in a stack direction matching a linear extending direction. The cooling plate is disposed on one side in a height direction of the prismatic batteries in the battery stack.

CITATION LIST

Patent Literature

PTL 1: Unexamined Japanese Patent Publication No. 2009-134901

SUMMARY OF THE INVENTION

A prismatic battery having higher energy density emits more heat during abnormal heat generation. Accordingly, more heat is conducted in a stack direction via a cooling plate from a prismatic battery having abnormal heat generation. Another prismatic battery may receive more heat from the prismatic battery having the abnormal heat generation via the cooling plate to have higher thermal damage risk.

In view of this, it is an object of the present disclosure to provide a battery pack that inhibits heat conduction in a stack direction via a cooling plate.

In order to achieve the object, the present disclosure provides a battery pack including: a battery stack having a plurality of prismatic batteries being stacked; and a cooling plate including a plurality of coolant passages extending in a stack direction of the prismatic batteries in the battery stack or a perpendicular direction substantially perpendicular to the stack direction and allowing a coolant to flow, and at least one heat conduction inhibitor configured to inhibit heat conduction in the stack direction, extending in the stack direction, and disposed along the battery stack.

The battery pack according to the present disclosure inhibits heat conduction in the stack direction via the cooling plate.

DESCRIPTION OF EMBODIMENT

An exemplary embodiment of the present disclosure will be described in detail hereinafter with reference to the accompanying drawings. The present disclosure initially assumes that, if the following description includes a plurality of exemplary embodiments, modification examples, and the like, features of these modes are appropriately combined to erect a new exemplary embodiment. The following description and the drawings refer to an X direction indicating a stack direction of a plurality of prismatic batteries 31 stacked in battery stack 21, a Y direction indicating a perpendicular direction, and a Z direction indicating a height direction of prismatic batteries 31. The X direction, the Y direction, and the Z direction are perpendicular to each other. Any modification example other than the following exemplary embodiment and modification examples to be described lastly will refer to the Z direction matching a thickness direction of cooling plate 41, 141, 241, 341, or 441. The present description will lastly have brief reference to a case where the perpendicular direction matches the height direction of the prismatic batteries and the thickness direction of the cooling plate is perpendicular to both the stack direction and the height direction of the prismatic batteries. The following description will also refer to expression upward indicating a side in the Z direction provided with an electrode terminal included in prismatic battery 31 and expression downward indicating an opposite side in the Z direction not provided with the electrode terminal in prismatic battery 31. Identical elements (configurations) depicted in the following drawings will be denoted by identical reference marks and will not be described repeatedly. The following drawings are provided as schematic views, and different drawings will depict each member having different scale ratios in longitudinal, lateral, and height directions.

Figure 1:
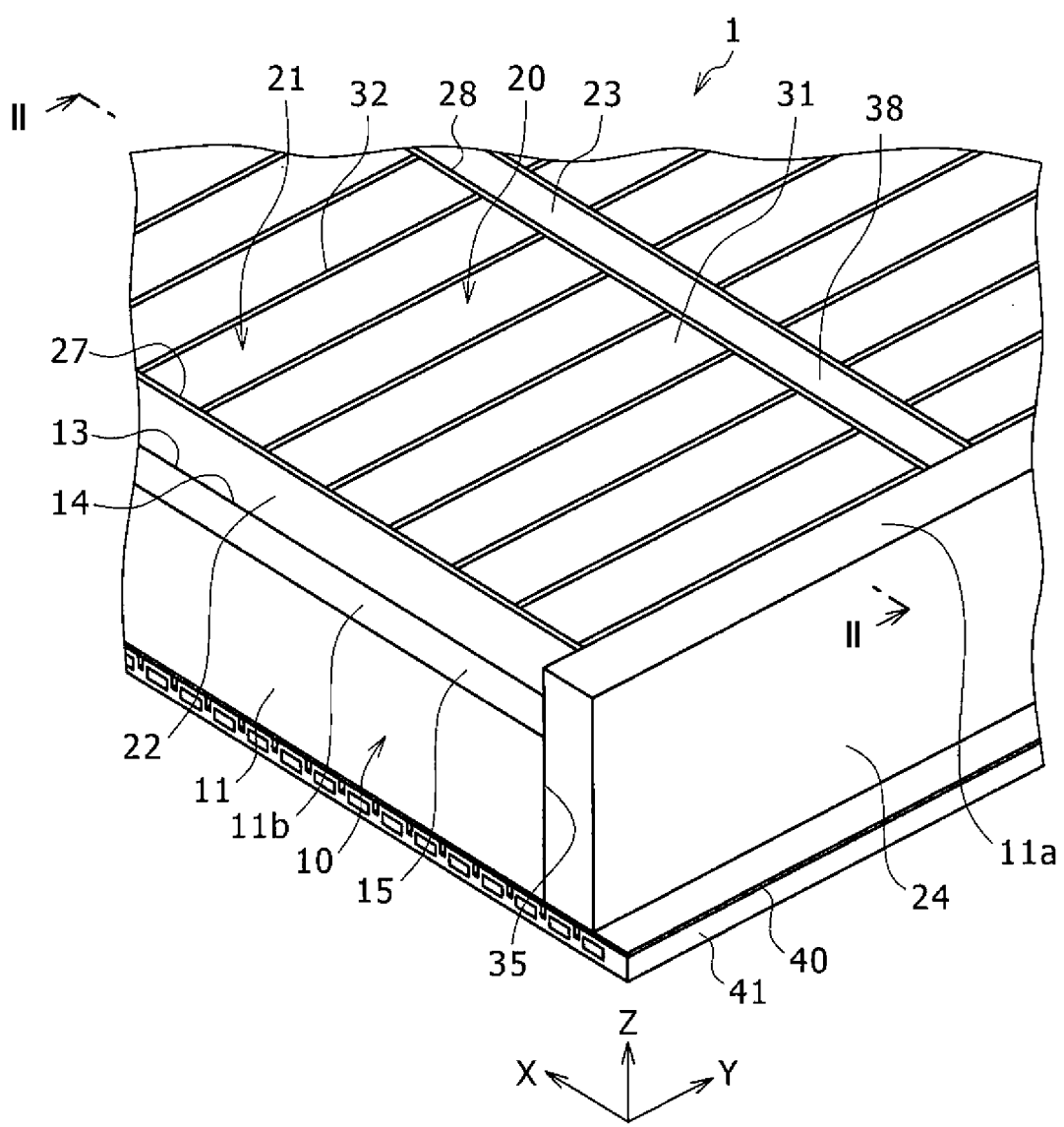
FIG. 1 is a schematic perspective view depicting part of a battery pack according to an exemplary embodiment of the present disclosure, in a state where a lid of a case of the battery pack is removed.

FIG. 1 is a schematic perspective view depicting part of battery pack 1 according to an exemplary embodiment of the present disclosure, in a state where a lid of case 10 of battery pack 1 is removed. FIG. 1 does not depict the electrode terminals of prismatic (=rectangular) batteries 31. As depicted in FIG. 1, battery pack 1 includes case 10 and a plurality of battery modules 20. Case 10 includes body 11, lid 12 (not depicted), and a plurality of screws (not depicted), and body 11 and the lid are made of metal such as aluminum or iron, or resin. Body 11 is a box-shaped member provided with recess 13 having a substantially rectangular parallelepiped shape, and recess 13 has rectangular opening 14 directed only upward in the Z direction. Body 11 has end surface 15 directed upward in the Z direction, and end surface 15 has screw holes (not depicted) disposed at predetermined intervals.

As depicted in FIG. 1, body 11 includes a pair of walls 11*a* extending in the Y direction, and a pair of walls 11*b* extending in the X direction. Walls 11*a* are larger in height than walls 11*b*. The lid is a rectangular tabular member in a planar view.

The lid is substantially equal in length in the X direction to walls 11b, and has a thickness substantially equal to a difference in height between walls 11a and walls 11b. After the plurality of battery modules 20 and the like are appropriately accommodated in recess 13, the lid is disposed between the pair of walls 11b in the X direction. The lid is disposed so as to have, when viewed in the Z direction, a first edge in the Y direction substantially matching a first edge in the Y direction of wall 11b on a first side in the X direction, and a second edge in the Y direction substantially matching a second edge in the Y direction of wall 11b on a second side in the X direction. The screws (not depicted) are then tightened to fasten the lid and the pair of walls 11b so as to attach the lid to body 11 and constitute battery pack 1. The present exemplary embodiment provides walls 11a larger in height than walls 11b, but should not be limited to this case. Walls 11b may alternatively be larger in height than walls 11a or be equal in height to walls 11a.

As depicted in FIG. 1, the plurality of battery modules 20 is disposed in recess 13 so as to be adjacent to each other in the Y direction. The plurality of battery modules 20 disposed to be adjacent to each other in the Y direction has an area in a planar view slightly less than an area in a planar view of recess 13. In the state where the plurality of battery modules 20 is accommodated in recess 13, battery modules 20 are each unshiftable relatively to recess 13 in the X direction and the Y direction.

Battery modules 20 each include battery stack 21, first side bind bar 22, second side bind bar 23, and a pair of end plates 24. In the present exemplary embodiment, the pair of end plates 24 matches the pair of walls 11a. The pair of end plates may not match the pair of walls extending in the Y direction in the case. Battery stack 21 includes the plurality of prismatic batteries (cells) 31 having a substantially rectangular parallelepiped shape, and a plurality of intercell separators 32. The plurality of prismatic batteries 31 is stacked to be lined and overlapped in the X direction, and intercell separators 32 are each disposed between two prismatic batteries 31 adjacent to each other in the X direction. Examples of prismatic batteries 31 include a rechargeable secondary battery such as a lithium ion battery, a nickel-hydrogen battery, or a nickel-cadmium battery, and prismatic batteries 31 each have a main surface covered with an insulating sheet like a shrink tube. Intercell separators 32 are sheet members made of an insulating material such as resin. Intercell separators 32 are provided to secure insulation between two prismatic batteries 31 adjacent to each other in the X direction.

First and second side bind bars 22, 23 are members having a tabular shape or a prismatic tube shape and made of metal such as aluminum, iron, or stainless steel, and extend in the X direction. First and second side bind bars 22, 23 each have a length in the X direction slightly larger than a length in the X direction of battery stack 21. First side bind bar 22 restrains a first end in the Y direction of battery stack 21 whereas second side bind bar 23 restrains a second end in the Y direction of battery stack 21. End plates 24 are tabular members made of metal such as aluminum or iron, and extend in the Y direction. End plate 24 disposed on a first side in the X direction restrains a first side in the X direction of battery stack 21 whereas end plate 24 disposed on a second side in the X direction restrains a second side in the X direction of battery stack 21. First and second side bind bars 22, 23 should not be limited to such metal members, but may alternatively be plastic members made of carbon fiber reinforced plastic (CFRP) or the like in order to achieve weight reduction rather than heat radiation.

Each of first and second side bind bars 22, 23 has both end surfaces 35 in the X direction each provided with a screw hole (not depicted) extending in the X direction and provided for fixation of an end plate, and each of the end plates 24 is provided with a through hole (screw hole). Each of battery modules 20 further include end separators (not depicted), first side separator 27, and second side separator 28. The end separators, first side separator 27, and second side separator 28 are sheet members made of an insulating material such as resin. The end separators are disposed between a first end in the X direction of battery stack 21 and end plate 24 disposed on the first side in the X direction, and between a second end in the X direction of battery stack 21 and end plate 24 disposed on the second side in the X direction. First and second side separators 27, 28 extend in the X direction. First and second side separators 27, 28 each have a length in the X direction substantially equal to a length obtained by totaling a length in the X direction of battery stack 21 and twice a length (thickness) in the X direction of the end separators. First side separator 27 is disposed between a first end in the Y direction of battery stack 21 and first side bind bar 22, whereas second side separator 28 is disposed between a second end in the Y direction of battery stack 21 and second side bind bar 23. The end separators are disposed between the both ends in the X direction of battery stack 21 and end plates 24, and side separators 27, 28 are disposed between the ends in the Y direction of battery stack 21 and side bind bars 22, 23. The screws are then tightened into the through holes in end plates 24 and the screw holes in side bind bars 22, 23 from outside in the X direction of end plates 24. The screws thus tightened integrate battery stack 21, first and second side bind bars 22, 23, the pair of end plates 24, the two end separators, and first and second side separators 27, 28, to constitute battery module 20. Prismatic batteries 31 in each battery stack 21 have first side surfaces in the Y direction restrained by first side bind bar 22 to be positioned substantially on an identical plane, and second side surfaces in the Y direction restrained by second side bind bar 23 to be positioned substantially on an identical plane. Alternatively, the pair of end plates 24 on the first and second sides may be pressed from the both sides by means of a press (not depicted), and the pair of end plates 24 compressing battery stacks 21 may be screwed to side bind bars 22, 23 to constitute battery modules 20.

Regarding two battery stacks 21 adjacent to each other in the Y direction according to the exemplary embodiment relating to FIG. 1, identical common side bind bar 38 constitutes second side bind bar 23 disposed on the second side in the Y direction of battery stack 21 on the first side in the Y direction and first side bind bar 22 disposed on the first side in the Y direction of battery stack 21 on the second side in the Y direction. Regarding the two battery stacks adjacent to each other in the Y direction, the second side bind bar disposed on the second side in the Y direction of the battery stack on the first side in the Y direction and the first side bind bar disposed on the first side in the Y direction of the battery stack on the second side in the Y direction may not be integrated but be provided independently from each other.

Regarding the plurality of battery modules 20 according to the exemplary embodiment relating to FIG. 1, which are overlapped when viewed in the Y direction, single and integral end plate 24 on the first side is shared to restrain the first side in the X direction of battery stack 21 in each battery module 20 whereas single and integral end plate 24 on the second side is shared to restrain the second side in the X direction of battery stack 21 in each battery module 20. The plurality of battery modules overlapped when viewed in the Y direction may not share the single and integral end plate on the first side but may be provided with an end plate on the first side configured to restrain only the first side in the X direction of the battery stack in each of the battery modules. Similarly, the plurality of battery modules overlapped when viewed in the Y direction may not share the single and integral end plate on the second side but may be provided with an end plate on the second side configured to restrain only the second side in the X direction of the battery stack in each of the battery modules.

As described above, battery stack 21 may include the plurality of intercell separators 32 stacked alternately with the plurality of prismatic batteries 31 such that intercell separators 32 insulate prismatic batteries 31 adjacent to each other. Battery stack 21 may alternatively include an end separator disposed between prismatic battery 31 at the first end in the X direction and end plate 24 on the first side and filling a gap between prismatic battery 31 at the first end and end plate 24 on the first side, and an end separator disposed between prismatic battery 31 at the second end in the X direction and end plate 24 on the second side and filling a gap between prismatic battery 31 at the second end and end plate 24 on the second side. The end separators thus configured may have elasticity. In this case, even if there is any change in size of the gap between prismatic battery 31 at an end in the X direction and at least one of end plates 24 on the first side and the second side, the gap can be easily filled with corresponding one of the end separators. Battery stacks 21 can thus preferably be disposed in intimate contact with each other in the X direction.

With continuous reference to FIG. 1, the case according to the present exemplary embodiment includes a bottom plate having heat transfer sheet 40, and cooling plate 41 made of metal such as aluminum or an aluminum alloy. Heat transfer sheet 40 is constituted by a sheet member exhibiting insulation and excellent heat conductivity, such as an epoxy resin sheet or a silicone rubber sheet. Heat transfer sheet 40 has a rectangular shape identical to the shape of cooling plate 41 in a planar view, is disposed on an upper surface, adjacent to battery modules 20, of cooling plate 41, and is interposed between cooling plate 41 and walls 11a, 11b. Screws are tightened from below cooling plate 41 to cooling plate 41, heat transfer sheet 40, and walls 11a, 11b, to fix cooling plate 41 and heat transfer sheet 40 to walls 11a, 11b.

Figure 2:
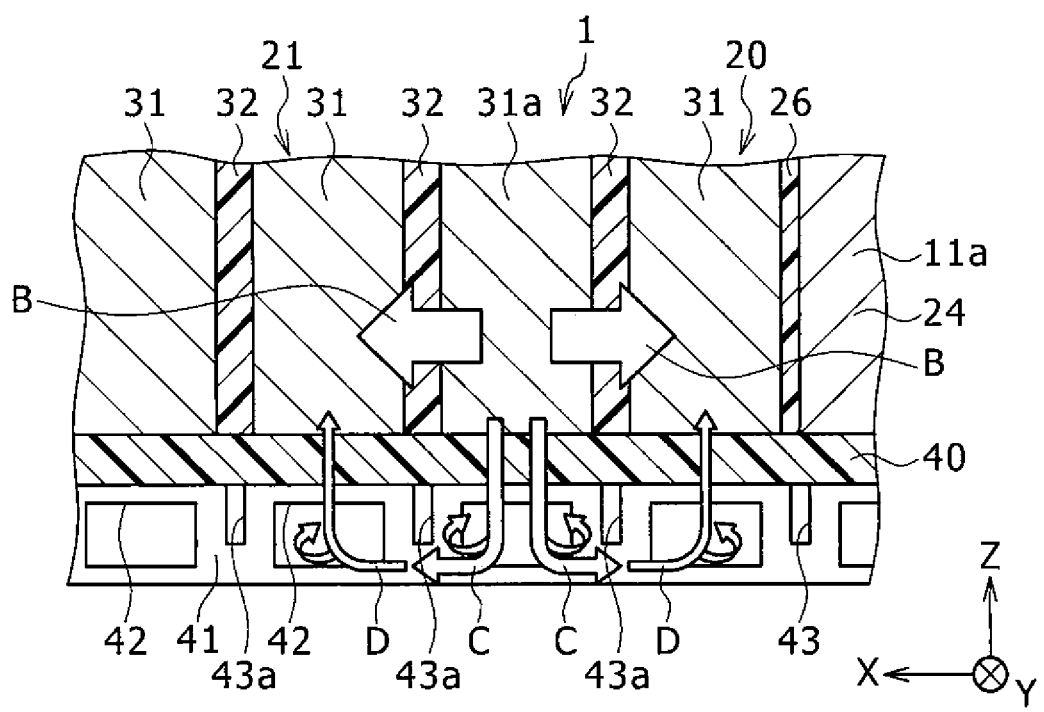
FIG. 2 is a partial schematic sectional view of the part depicted in FIG. 1 and taken along line II-II.

FIG. 2 is a partial view of the part depicted in FIG. 1 and taken along line II-II. As depicted in FIG. 2, cooling plate 41 includes a plurality of coolant passages 42. The plurality of coolant passages 42 is disposed apart from each other in the X direction, and coolant passages 42 each linearly extend in the Y direction from a first end to a second end in the Y direction of cooling plate 41. Each coolant passage 42 is opened at both ends in the Y direction. The coolant passages allow a coolant (refrigerant) such as water provided with fluid power by a pump or the like (not depicted) to flow via a pipe (not depicted) extending in the X direction and coupled to the openings of coolant passages 42. Cooling plate 41 is cooled by the coolant.

Coolant passages 42 according to the present exemplary embodiment each have an XZ section in a substantially rectangular shape. The XZ section of each coolant passage 42 may alternatively have any shape such as a circular shape other than the rectangular shape. Coolant passages 42 are disposed substantially at the center in the thickness direction (Z direction) of cooling plate 41. The plurality of coolant passages 42 is disposed in cooling plate 41 such that each coolant passage 42 is overlapped with the center in the X direction of prismatic batteries 31. Cooling plate 41 further includes a plurality of grooves 43. Grooves 43 each constitute a heat conduction inhibitor. Grooves 43 each linearly extend in the Y direction from the first end to the second end in the Y direction of cooling plate 41. Each groove 43 is opened at both ends in the Y direction, and is opened upward in the Z direction (toward battery stacks 21 in the Z direction (the thickness direction of cooling plate 41)). Each groove 43 is disposed between, in the X direction, two coolant passages 42 adjacent to each other. The plurality of grooves 43 includes a plurality of grooves 43a each having a portion overlapped with corresponding one of intercell separators 32 when viewed in the Z direction. Grooves 43a each constitute a separator overlap inhibitor. Grooves 43 each have a portion overlapped with coolant passages 42 when viewed in the X direction. FIG. 2 includes reference mark 26 denoting the end separator.

Figure 3:
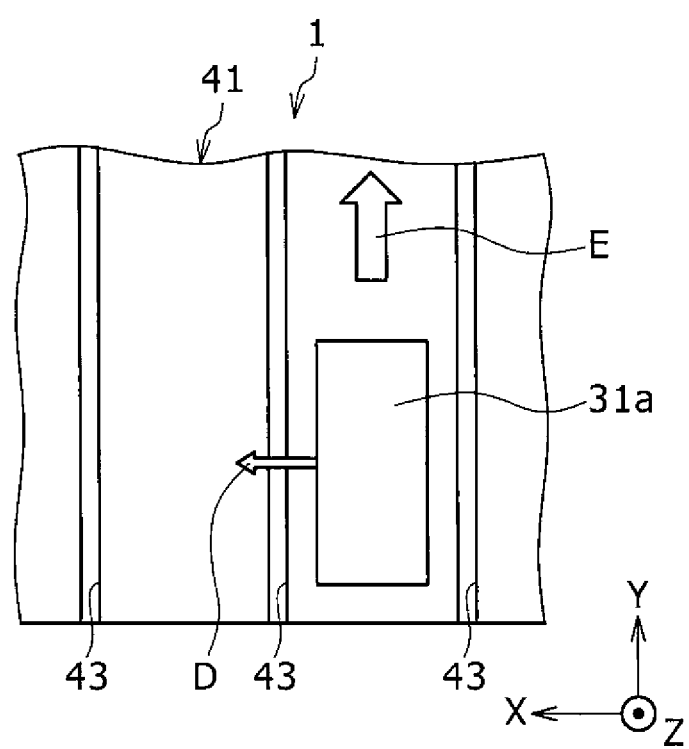
FIG. 3 is a schematic plan view from above, of a cooling plate included in the battery pack, explanatorily depicting a positional relation between the cooling plate and a trigger cell as well as a flow of heat from the trigger cell, without depicting a heat transfer sheet.
Figure 4:
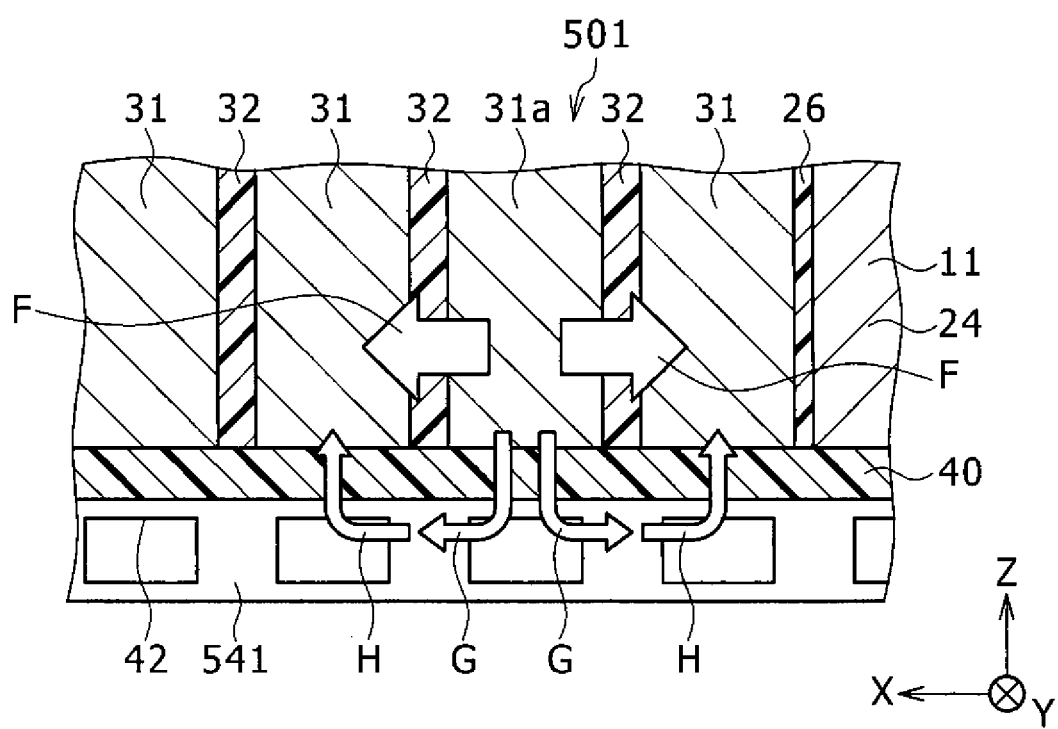
FIG. 4 is a schematic sectional view corresponding to FIG. 2, of a battery pack according to a reference example differentiated by provision of no groove, in comparison to the battery pack mentioned above.
Figure 5:
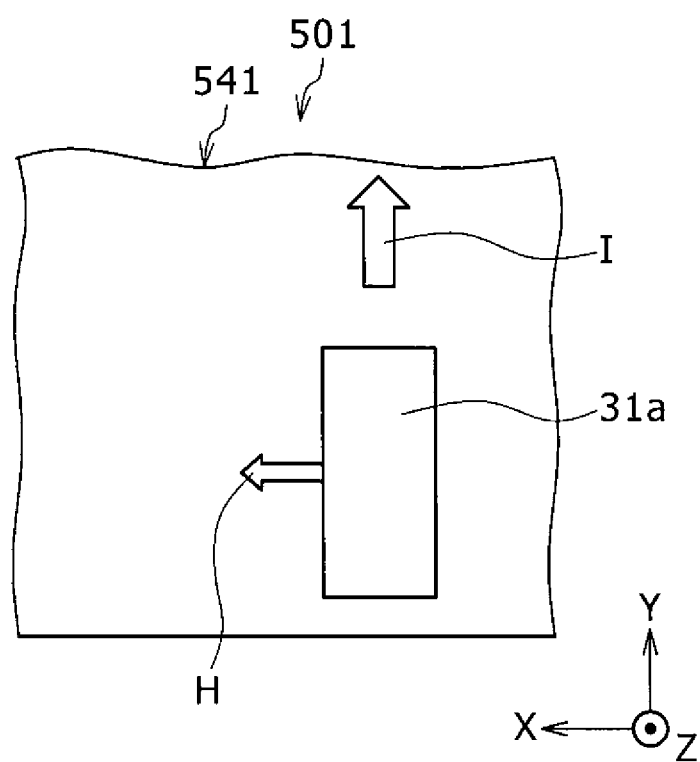
FIG. 5 is a schematic plan view corresponding to FIG. 3, of the battery pack according to the reference example.

Described next with reference to FIG. 2 to FIG. 5 is functional effect achieved by provision of grooves 43. FIG. 3 is a schematic plan view from above, of cooling plate 41, explanatorily depicting a positional relation between cooling plate 41 and trigger cell 31a as well as a flow of heat from trigger cell 31a, without depicting heat transfer sheet 40. FIG. 4 is a schematic sectional view corresponding to FIG. 2, of battery pack 501 according to a reference example differentiated only by provision of no groove 43 in comparison to battery pack 1. FIG. 5 is a schematic plan view corresponding to FIG. 3, of battery pack 501 according to the reference example.

As depicted in FIG. 4, in battery pack 501 according to the reference example, heat from prismatic battery (hereinafter, called a trigger cell) 31a having abnormal heat generation is transmitted to prismatic batteries 31 adjacent in the X direction via intercell separators 32 as indicated by arrows F. The heat from trigger cell 31a is further transmitted to cooling plate 541 via heat transfer sheet 40 as indicated by arrows G. Battery pack 501 according to the reference example includes no grooves 43, so that the heat transmitted to cooling plate 541 is mostly transmitted again to adjacent prismatic batteries 31 via heat transfer sheet 40 as indicated by arrows H. Each adjacent prismatic battery 31 thus receives the heat from trigger cell 31a as indicated by arrow F as well as large heat indicated by arrow G and arrow H to be likely to be thermally damaged.

As depicted in FIG. 5, battery pack 501 according to the reference example includes no grooves 43, so that heat transmitted from trigger cell 31a in the X direction indicated by arrow H is approximately equal in quantity to heat transmitted from trigger cell 31a in the Y direction indicated by arrow I. Remaining prismatic batteries 31 belonging to battery stack 21 including trigger cell 31a are thus likely to receive heat from trigger cell 31a and be thermally damaged.

In contrast, in battery pack 1 according to the present exemplary embodiment, heat transmitted via intercell separators 32 as indicated by arrows B is conducted to prismatic batteries 31 adjacent in the X direction similarly to battery pack 501. However, heat transmitted downward in the Z direction from trigger cell 31a via heat transfer sheet 40 as indicated by arrows C is prevented from being conducted in the X direction by grooves 43. Part of the heat conducted as indicated by arrows C thus fails to pass grooves 43, and heat less than the heat transmitted as indicated by arrows C is conducted in the X direction as indicated by arrows D and is then conducted to adjacent prismatic batteries 31. In comparison to battery pack 501 according to the reference example, battery pack 1 can significantly reduce heat conducted from cooling plate 41 to prismatic batteries 31 adjacent to trigger cell 31a in the X direction. Battery pack 1 according to the present exemplary embodiment includes grooves 43 for inhibition of heat transmission as depicted in FIG. 3, so that heat conducted in the X direction from trigger cell 31a as indicated by arrow D is smaller in quantity than heat conducted in the Y direction from trigger cell 31a as indicated by arrow E. This leads to inhibition (=suppression) or prevention of thermal damage risk of adjacent prismatic batteries 31. Heat conduction in cooling plate 41 from trigger cell 31a to prismatic batteries 31 adjacent to trigger cell 31a in battery stack 21 in a row adjacent in the Y direction to battery stack 21 including trigger cell 31a has a longer route in comparison to adjacent prismatic batteries 31 in battery stack 21 including trigger cell 31a. Reduction in quantity of conducted heat according to the route length of heat conduction leads to inhibition or prevention of thermal damage risk of prismatic batteries 31 in adjacent battery stack 21 due to heat from trigger cell 31a.

Intercell separators 32 are made of resin such as polypropylene (PP), polybutylene terephthalate (PBT), or polycarbonate (PC). Such resin serves as an intercell heat insulating material. Intercell separators 32 made of the heat insulating material reduce heat conducted between adjacent prismatic batteries 31 via intercell separators 32 (arrows B). Such reduction as well as reduction of heat conducted between adjacent prismatic batteries 31 via cooling plate 41 advantageously inhibit or prevent thermal damage risk from trigger cell 31a to adjacent prismatic batteries 31. Intercell separators 32 are preferably made of a heat insulating material exhibiting more excellent heat insulation than the resin. Intercell separators 32 can be made of a heat insulating material having a structure including a structural member provided with cavities like a fiber sheet configured as nonwoven fabric or the like and a porous material like silica xerogel supported in the cavities. This heat insulating material has thermal conductivity of about 0.018 W/m·K to 0.024 W/m·K and has a thickness of about 1 mm to 2 mm in consideration of energy density decrease as a battery module.

As described above, battery pack 1 includes battery stacks 21 each having the plurality of prismatic batteries 31 stacked in the X direction. Battery pack 1 further includes the plurality of coolant passages 42 extending in the Y direction substantially perpendicular to both the X direction and the Z direction and allowing the coolant to flow, and cooling plate 41 having the plurality of grooves 43 inhibiting (=suppressing) heat conduction in the X direction.

Grooves 43 thus inhibit (=suppress) heat conduction in the X direction in cooling plate 41. This configuration inhibits heat conducted to remaining prismatic batteries 31 belonging to battery stack 21 including trigger cell 31a, and inhibits or prevents thermal damage to remaining prismatic batteries 31.

Grooves 43 may be opened upward in the Z direction (toward battery stacks 21 in the thickness direction of cooling plate 41) and be extend in the Y direction.

Grooves 43 in this configuration inhibits heat transmission in the X direction above cooling plate 41. Heat transmitted from trigger cell 31a to adjacent prismatic batteries 31 via cooling plate 41 thus turns around largely in a depth direction of grooves 43 with significant reduction in heat transmission.

Cooling plate 41 may include the plurality of coolant passages 42. Grooves 43 may each be disposed between, in the X direction, two coolant passages 42 adjacent to each other in the X direction.

Grooves 43 are not overlapped with coolant passages 42 when viewed in the Z direction in the above configuration. The coolant flowing through coolant passages 42 can thus excellently cool battery stacks 21 even if grooves 43 are provided.

Battery stack 21 may include Intercell separators 32 each disposed between two prismatic batteries 31 adjacent to each other in the X direction and exhibiting insulation. The plurality of grooves 43 may include at least one groove 43a having a portion overlapped with intercell separator 32 when viewed in the Z direction.

At least one groove 43a is disposed between prismatic batteries 31 in the X direction in the above configuration. Groove 43a efficiently inhibits heat transmitted from trigger cell 31a to adjacent prismatic batteries 31, exerting significant functional effect of heat conduction inhibition achieved by provision of groove 43a.

Grooves 43 may each extend in the Y direction and be opened toward battery stack 21 in the Z direction. Grooves 43 may each have a portion overlapped with coolant passage 42 when viewed in the Z direction.

Grooves 43 in the above configuration are each deep enough to be overlapped with coolant passage 42 when viewed in the Z direction. This causes heat to turn around largely for effective inhibition of heat conducted across grooves 43 in the X direction.

Coolant passages 42 in battery pack 1 linearly extend in the Y direction from the first end to the second end in the Y direction of cooling plate 41. Grooves 43 also linearly extend in the Y direction from the first end to the second end in the Y direction of cooling plate 41. Cooling plate 41 can thus be formed through extrusion molding easily at low cost.

The present disclosure should not be limited to the above exemplary embodiment and the modification example, but can be variously improved or changed in terms of matter recited in claims of the present application and an equivalent scope.

Figure 6:
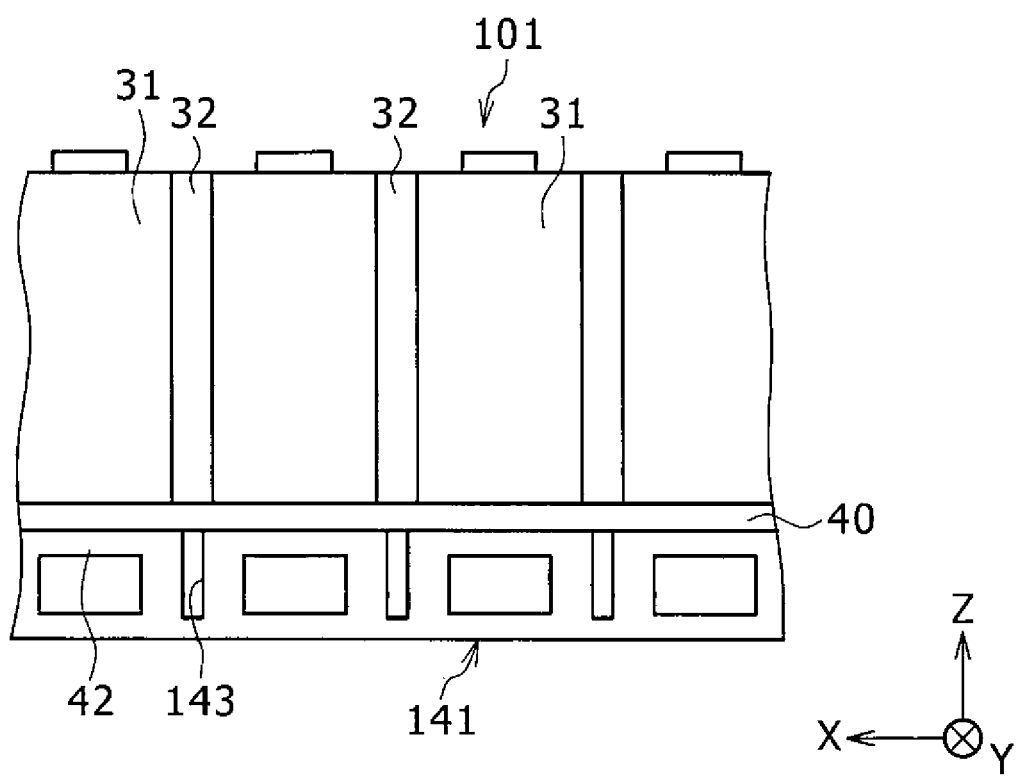
FIG. 6 is a schematic side view depicting part of a battery pack according to a modification example.

As depicted in FIG. 2, grooves 43 according to the above exemplary embodiment each have a bottom positioned above in the Z direction the lower end in the Z direction of coolant passages 42. As depicted in FIG. 6 including a schematic side view of part of battery pack 101 according to a modification example, grooves 143 in cooling plate 141 each have a bottom that may be positioned below in the Z direction the lower end in the Z direction of coolant passages 42. Heat turning around may thus be further reduced for further improvement of heat transmission inhibition in the X direction.

Figure 7:
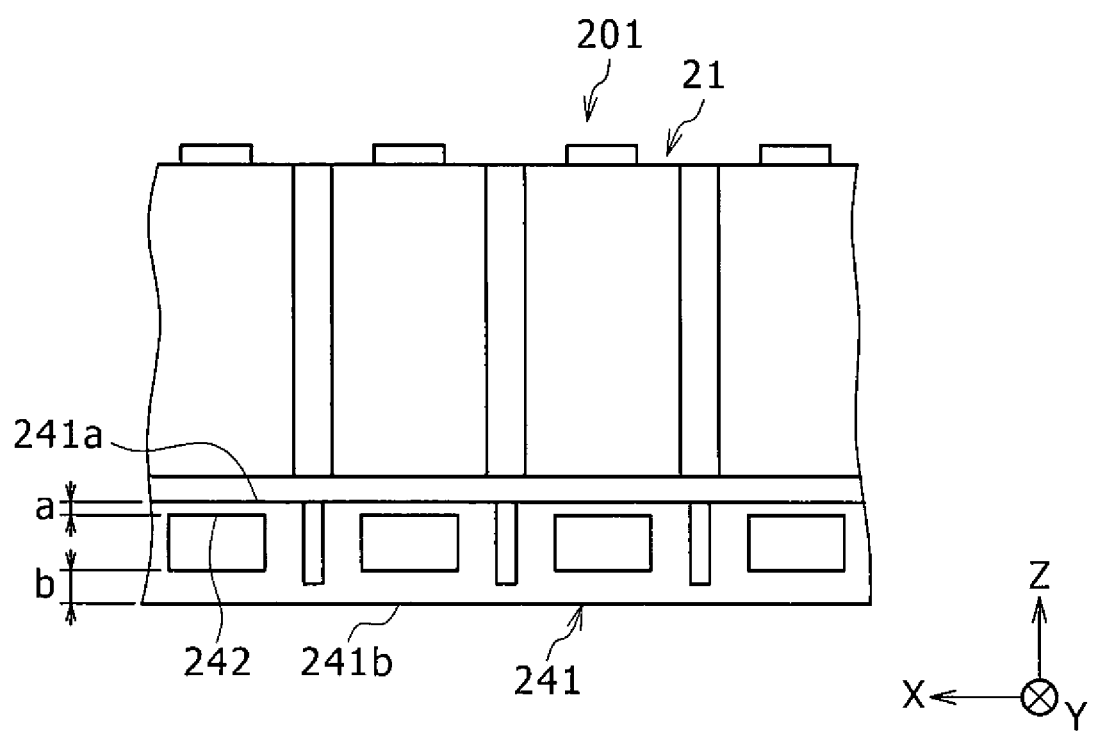
FIG. 7 is a schematic view corresponding to FIG. 6, of a battery pack according to another modification example.

The above description refers to the case where coolant passages 42 are disposed at the center in the thickness direction of cooling plate 41 as depicted in FIG. 2. As depicted in FIG. 7 including a schematic view corresponding to FIG. 6 of battery pack 201 according to another modification example, distance a between coolant passage 242 and first surface (upper surface) 241a, adjacent to battery stack 21 in the Z direction, of cooling plate 241 may be shorter than distance b between coolant passage 242 and second surface (lower surface) 241b, opposite to the first surface in the Z direction, of cooling plate 241. In this manner, the coolant flowing through coolant passages 242 may more effectively cool battery stacks 21, and cooling plate 241 may reduce heat conducted in the X direction above in the Z direction of coolant passage 242.

Figure 8:
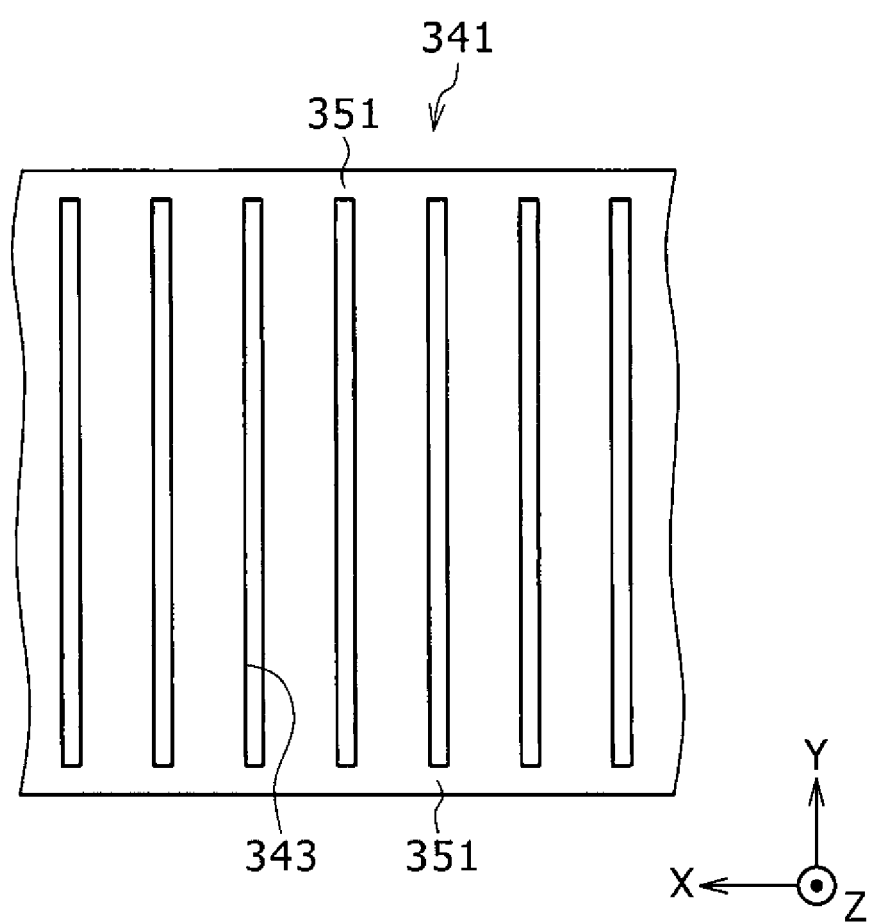
FIG. 8 is a schematic plan view of a cooling plate according to still another modification example.

The above description also refers to provision of grooves 43 extending in the Y direction from the first end to the second end in the Y direction of cooling plate 41. The cooling plate may alternatively include a groove having at least one end in the Y direction not opened in the Y direction. As depicted in FIG. 8 including a schematic plan view of cooling plate 341 according to still another modification example, cooling plate 341 may have a plurality of through holes 343 each having a long opening extending in the Y direction. The plurality of through holes 343 may be spaced apart from each other in the X direction and penetrate from the first end to the second end in the Z direction of cooling plate 341. In this case, heat is conducted in the X direction in a region limited to both ends 351 in the Y direction substantially closer to ends in the Y direction than through holes 343. This configuration significantly inhibits heat conduction in the X direction. Preferably, the cooling plate includes a plurality of coolant passages and the through holes are each disposed between two coolant passages adjacent to each other in the X direction. Preferably, the battery stack includes intercell separators each disposed between two prismatic batteries adjacent to each other in the X direction and exhibiting insulation, and at least one through hole includes at least one separator overlapped through hole having a portion overlapped with one of the intercell separators when viewed in the Z direction. Through hole 343 obviously constitutes the heat conduction inhibitor.

Figure 9:
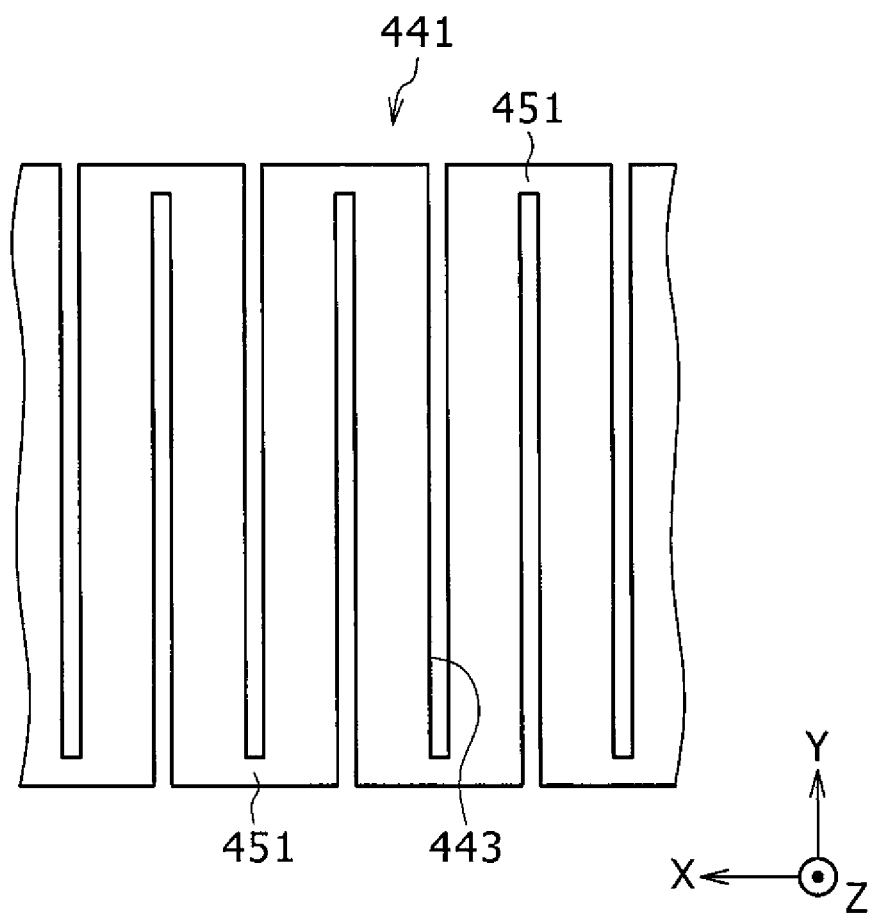
FIG. 9 is a schematic plan view of a cooling plate according to a still different modification example.

As depicted in FIG. 9 including a schematic plan view of cooling plate 441 according to a still different modification example, cooling plate 441 may include a plurality of recesses 443 each having a depth in the Y direction and having a depth length of a depth direction matching the Y direction. The plurality of recesses 443 may be spaced apart from each other in the X direction, penetrate from the first end to the second end in the Z direction of cooling plate 441, and be opened in the Y direction at only one side in the Y direction. Two recesses 443 adjacent to each other in the X direction may alternatively be opened at sides opposite to each other in the Y direction. In this case, heat is conducted in the X direction while inevitably meandering in cooling plate 441. Heat is conducted in the X direction in a region limited to only one end 451 in the Y direction closer to the end in the Y direction than recesses 443. This configuration significantly exhibits inhibition of heat conduction in the X direction. This configuration further improves rigidity of cooling plate 441 in comparison to the modification example in which two recesses 443 adjacent to each other in the X direction are opened in the Y direction on the identical side in the Y direction. Preferably, the cooling plate has a plurality of coolant passages and the recesses are each disposed between, in the X direction, two coolant passages adjacent to each other in the X direction. Preferably, the battery stack includes intercell separators each disposed between two prismatic batteries adjacent to each other in the X direction and exhibiting insulation, and at least one recess includes at least one separator overlapped recess having a portion overlapped with one of the intercell separators when viewed in the Z direction. Recesses 443 obviously constitute the heat conduction inhibitors.

The above description also refers to the case where cooling plate 41, 141, 241, 341, or 441 includes the plurality of heat conduction inhibitors configured identically. The cooling plate may include at least two heat conduction inhibitors among grooves 43, 143 described with reference to FIG. 2 or FIG. 6, through holes 343 described with reference to FIG. 8, and recesses 443 described with reference to FIG. 9. The above description also refers to the case where cooling plate 41 includes the plurality of heat conduction inhibitors. The cooling plate may alternatively include only one heat conduction inhibitor. The above description also refers to the case where the heat conduction inhibitor extends in the Y direction. The cooling plate may alternatively include a heat conduction inhibitor at least partially extending obliquely to the Y direction. The above description also refers to the case where cooling plate 41 constitutes part of the bottom plate of the case of battery pack 1. Alternatively, the cooling plate may be provided separately from the bottom plate of the case of the battery pack, and may be disposed below the bottom plate in the Z direction. The above description also refers to the case where, assuming that the prismatic batteries having the substantially rectangular parallelepiped shape are defined in terms of a lateral direction, a longitudinal direction, and a height direction, the X direction as the stack direction matches the lateral direction (thickness direction) of prismatic batteries 31. The X direction as the stack direction may alternatively match the longitudinal direction of the prismatic batteries.

The above description also refers to the case where cooling plate 41, 141, 241, 341, or 441 is disposed on one side in the Z direction (below in the Z direction) of battery stacks 21 and extends in the X direction. The above description also refers to the case where cooling plate 41, 141, 241, 341, or 441 includes coolant passages 42, 242 extending in the Y direction. The cooling plate may alternatively be disposed on at least one side of the battery stacks such that the thickness direction matches a direction perpendicular to both the height direction and the stack direction of the prismatic batteries, and extend in the stack direction. The cooling plate may include at least one coolant passage extending in the stack direction. In this case, the perpendicular direction preferably matches the height direction, and at least one heat conduction inhibitor preferably includes at least one selected from at least one groove extending in the perpendicular direction (height direction) and opened toward the battery stacks in the thickness direction of the cooling plate, at least one through hole provided with a long opening having a longitudinal direction matching the perpendicular direction (height direction) and penetrating the cooling plate in the thickness direction of the cooling plate, or at least one recess having a depth direction matching the perpendicular direction (height direction) and opened on both sides in the thickness direction of the cooling plate. Also in this case, the at least one heat conduction inhibitor preferably includes at least one separator overlap inhibitor having a portion overlapped with one of the intercell separators when viewed in the thickness direction of the cooling plate. Also in this case, the coolant passage and a first surface adjacent to the battery stacks in the thickness direction of the cooling plate has a distance preferably shorter than a distance between the coolant passage and a second surface opposite to the first surface in the thickness direction of the cooling plate.

The invention claimed is:
1. A battery pack comprising:
a battery stack including a plurality of prismatic batteries being stacked along a first direction; and
a cooling plate including:
a plurality of coolant passages, arranged in the first direction and each extending in a second direction crossing the first direction and allowing a coolant to flow; and
a heat conduction inhibitor configured to inhibit heat conduction in the first direction, and extending in the second direction, wherein:
the heat conduction inhibitor includes a groove extending in the second direction and having an opening at an upper surface of the cooling plate in a thickness direction of the cooling plate and a depth in the thickness direction of the cooling plate larger than a largest inner dimension of the groove in the first direction,
a bottom of the groove is further from the battery stack than any portion in an inner surface of each of the plurality of coolant passages in the thickness direction,
the heat conduction inhibitor is disposed between adjacent two of the plurality of coolant passages when viewed in the thickness direction of the cooling plate,
the battery stack includes intercell separators each disposed between two of the prismatic batteries adjacent to each other in the first direction and exhibiting insulation,
a dimension of the heat conduction inhibitor in the first direction is smaller than a dimension of each of the intercell separators in the first direction, and
the heat conduction inhibitor overlaps with a corresponding one of the intercell separators when viewed in the thickness direction of the cooling plate.

2. The battery pack according to claim 1, wherein the intercell separators are made of a heat insulating material.

3. The battery pack according to claim 1, wherein:
when viewed in the second direction, the groove has a portion overlapped with at least one of the plurality of coolant passages.

4. The battery pack according to claim 1, wherein one of the plurality of coolant passages and a first surface adjacent to the battery stack in the thickness direction of the cooling plate have a distance shorter than a distance between at least one of the plurality of coolant passages and a second surface opposite to the first surface in the thickness direction of the cooling plate.

5. The battery pack according to claim 1, wherein a plurality of heat conduction inhibitors are provided to the cooling plate.

6. The battery pack according to claim 1, further comprising a heat transfer sheet disposed between the battery stack and the cooling plate.

7. The battery pack according to claim 6, wherein the heat transfer sheet covers the opening of the groove.

8. The battery pack according to claim 1, wherein a part of a constituting material of the cooling plate is disposed between at least one end of the heat conduction inhibitor in the second direction and an edge of the cooling plate when viewed in the thickness direction of the cooling plate.

9. The battery pack according to claim 1, wherein each of the plurality of coolant passages has side openings at both ends in the second direction and is fully surrounded by the cooling plate in a cross section perpendicular to the second direction.

* * * * *